March 12, 1968  E. L. COOK  3,372,748

POLYMER REDEPOSITION PROCESS FOR WATERFLOOD

Filed April 14, 1965

EVIN L. COOK
INVENTOR

BY *James C. Fails*
ATTORNEY

United States Patent Office 3,372,748
Patented Mar. 12, 1968

3,372,748
POLYMER REDEPOSITION PROCESS FOR WATERFLOOD
Evin L. Cook, Dallas, Tex., assignor to Mobil Oil Corporation, a corporation of New York
Filed Apr. 14, 1966, Ser. No. 542,610
17 Claims. (Cl. 166—9)

ABSTRACT OF THE DISCLOSURE

This specification discloses an oil recovery process in which a slug of a dilute aqueous polymer solution is injected into a subterranean oil-containing formation and then followed by a slug of a dilute aqueous caustic solution. Thereafter, water is injected to drive the polymer and caustic solutions through the formation and oil is recovered from the formation through suitable production means.

---

Figure 1:
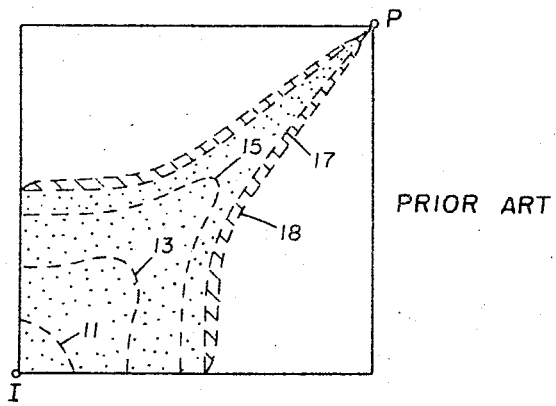

This invention pertains to recovery of petroleum, more commonly called oil, from a subterranean formation. More particularly, the invention pertains to a method of recovering oil contained in a subterranean formation by flooding the formation with water.

Oil accumulated within a subterranean formation is recovered or produced therefrom through wells, called production wells, drilled into the subterranean formation. A large amount of the oil is left in the subterranean formations if produced only by primary depletion, i.e., where only initial formation energy is used to recover the oil. Where the initial formation energy is inadequate or has become depleted, supplemental operations, often referred to as secondary recovery operations, are employed. In the most successful and most widely used of these operations, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as flooding liquid or flooding water as distinguished from the in-situ, or connate, water.

Although conventional waterflooding is effective in obtaining additional oil from oil-containing subterranean formations, it has a number of shortcomings. Foremost among these shortcomings is a tendency of flooding water to "finger" through an oil-containing formation and to bypass substantial portions thereof. By fingering is meant the developing of unstable bulges or stringers which advance toward the production wells more rapidly than the remainder of the flooding water. Furthermore, the water does not normally displace as much oil in the portions of the formation which it contacts as it potentially is capable of doing.

It has been established that waterfloods perform less satisfactorily with viscous oils than with relatively non-viscous oils. The fingering and bypassing tendencies of water are more or less directly related to the ratio of the viscosity of the oil to the viscosity of the flooding water. The viscosity of these oils varies from as low as 1 or 2 centipoises to 1,000 centipoises or higher. Water generally has a viscosity of about 1 centipoise.

In order to restrict the mobility of the water to no greater than the mobility of the oil, water thickening agents have been added to increase the viscosity of the water. Mobility is defined as the relative permeability which the formation has for a particular fluid divided by the viscosity of the fluid. Suitable agents for increasing the viscosity of the flooding water are water-soluble, high molecular weight polymers. These polymers absorb on the formation surfaces, and accumulate in and reduce permeability through the rock pores. Consequently, the polymers cause the flooding water injected therebehind to flow into previously uninvaded portions of the formation. Furthermore, these polymers can be rendered only slightly susceptible to most adverse effects present in the subterranean formation. There is, however, one effect which makes employing the polymers relatively uneconomical. That effect is the adsorption of the polymer from the polymer solution onto the surfaces of the subterranean formation. This adsorption not only wastes the polymer but also restricts the rate at which flooding water can be injected practicably.

Accordingly, it is an object of this invention to provide a method of recovering oil from an oil-containing subterranean formation employing a viscous polymer solution wherein the polymer which is adsorbed from the polymer solution onto the subterranean formation is subsequently desorbed and redeposited, thus increasing the portion of the formation from which oil is displaced by flooding water.

It is also an object of the invention to provide an inexpensive, inorganic adsorbate to decrease the adverse effects of adsorption of polymer from a viscous flooding water being employed in recovering oil from an oil-containing subterranean formation.

Figure 2:
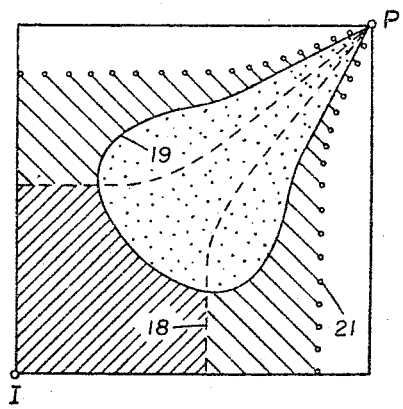

Further objects and attendant advantages of the invention will be apparent from the following detailed description taken in conjunction with the accompanying drawings in which:

FIGURE 1 illustrates diagrammatically the progress of the polymer solution through one quadrant of a conventional flooding pattern, and FIGURE 2 illustrates the increased portion swept by employing the invention in the same quadrant.

In accordance with the invention, oil is recovered from an oil-containing subterranean formation having an injection means and a production means completed therein by a method comprising the following steps:

(a) Injecting a slug of a dilute aqueous polymer solution through the injection means into the subterranean formation, (b) Injecting a slug of a dilute aqueous caustic solution through the injection means into the subterranean formation, (c) Injecting water to drive the caustic and the polymer solutions and the oil within the formation toward the production means, and (d) Producing the oil to the surface of the earth through the production means.

As noted, the polymer in the aqueous polymer solution improves the efficiency of recovery by: (1) increasing the viscosity of the flooding water, and (2) adsorbing on the formation surfaces and accumulating in the rock pores to reduce the permeability. It thereby partially plugs invaded portions of the formation and forces the flooding water into uninvaded portions of the formation. The caustic in the caustic solution injected behind the polymer solution is selectively adsorbed onto the formation surfaces. The adsorption of the caustic results in desorption of the polymer. Thus, the polymer is desorbed from the surfaces of the formation onto which it has adsorbed, and is dispersed in the aqueous caustic solution. As the caustic solution travels within the subterranean formation, caustic is adsorbed therefrom. Ultimately, the caustic is depleted to the point where the polymer is redeposited on new surfaces. Again, the polymer acts as it did before in forcing the flooding water into uninvaded areas. Upon subsequent contact with new caustic solution, the polymer is again desorbed, dispersed, and redeposited. Hence, a multifold use of the polymer in achieving enhanced recovery of oil from the subterranean formation is effected. Inherently, the concentrations of the polymer and the caustic vary as the solutions are driven through the subterranean formation.

The term "water" in connection with waterflooding is used herein to include dilute aqueous solutions such as surface water, well water, rain water, city water, treated waste water, and suitable oil field brines. Any oil field brine which will form a precipitate with the aqueous fluids in the oil-containing formation is not deemed suitable and would not be employed in a waterflood.

The polymers which are employed in the dilute aqueous polymer solution may be any of the polymers which have been previously described in the patents and literature for increasing the viscosity of the flooding water. Although these polymers may be naturally occurring polymers, such as karaya gum, there is a tendency of their solutions to lose viscosity through decay of such natural polymers. The synthetic polymers are generally superior in performance to the natural polymers. Illustrative suitable synthetic polymers include polyvinylpyridine, acrylamide-acrylic acid copolymer, and copolymers of methyl vinyl ether and maleic anhydride.

Other suitable synthetic polymers for use in the process of the invention include water-soluble homopolymers prepared from acyclic unsaturated carboxylic acids, such as acrylic acid and substituted acrylic acids, e.g., polyacrylic acid and sodium polymethacrylate; copolymers of unsaturated carboxylic acids, such as acrylic acid and methacrylic acid, with low molecular weight olefins, such as propylene and isobutylene; sulfonated polyvinyl aromatics, such as sulfonated polystyrene and sulfonated polyvinyl toluene; sulfonated copolymers of styrene and of vinyl toluene; and the like.

Methods for polymerizing the foregoing organic monomers to produce the water-soluble synthetic polymers have been described in the chemical and patent literature and a discussion thereof is not believed necessary.

Three kinds of polymers are particularly well adapted for employment in thickening flooding water.

The first kind of these polymers consists of amine adducts of copolymers of ethylenically unsaturated compounds and maleic anhydride. These amine adducts of copolymers of ethylenically unsaturated compounds and maleic anhydride are known. The copolymers of ethylenically unsaturated compounds and maleic anhydride are produced by copolymerizing vinyl compounds such as styrene, vinyl toluene, vinyl naphthalene, and the like, with maleic anhydride. The copolymers are obtained in high molecular weights by using azobisisobutyronitrile as catalyst, and polymerizing at low temperatures, such as 30°–60° C. Other catalysts can be used, such as benzoyl peroxide and cumene hydroperoxide. Specific ethylenically unsaturated compounds exemplifying monomers that may be copolymerized with maleic anhydride are as follows: styrene, vinyl toluene, α-methyl styrene, p-chlorostyrene, vinylnaphthalene, ethylene, propylene, isobutylene, ethyl acrylate, and methyl methacrylate.

The amine adducts of the copolymers of the ethylenically unsaturated compound and the maleic anhydride are prepared by reacting the copolymer with an amine to convert the anhydride groups to half amide-half acid groups. Satisfactory amines are those having from about 1 to about 5 carbons atoms. Particularly desirable amines are methyl amine, ethyl amine, n-propyl amine, isopropyl amine, dimethyl amine, and diethyl amine. Mixtures of these amines may be used.

The second kind of the particularly suitable polymers are the polyacrylamides having from 2 to about 67, preferably 5 to 45, mol percent of the carboxamide groups in the polymer hydrolyzed to carboxyl groups.

The third kind of these polymers are the heteropolysaccharides produced by fermentation of sugar, starches, and other carbohydrates by the bacteria of the genus Xanthomonas. Especially satisfactory are the heteropolysaccharides produced by *Xanthomonas campestris*, *Xanthomonas begonia*, *Xanthomonas phaseoli*, *Xanthomonas hederae*, *Xanthomonas incanae*, *Xanthomonas carotae*, and *Xanthomonas translucens*.

More than one polymer may be employed in the polymer solution if desired.

In general, the polymers employed in the aqueous polymer solution have a molecular weight high enough to impart appreciable increases in viscosity at low concentrations. It is generally desirable that the molecular weights be at least 1,000,000 in order to effect the desired increases in viscosity at the low concentrations which are economically feasible. Polymers having a molecular weight of 10,000,000 or higher may be employed.

The caustic which is employed in the caustic solution includes the usual monovalent hydroxides and carbonates which afford relatively high pH at low concentrations. Generically, the alkali metal hydroxides and carbonates are employed. Specifically, sodium hydroxide, sodium carbonate, potassium hydroxide, potassium carbonate, lithium hydroxide, lithium carbonate, cesium hydroxide, or cesium carbonate may be employed. For economical reasons, sodium hydroxide or sodium carbonate is preferred. More than one caustic may be employed in the caustic solution if desired.

In the polymer solution, a concentration of from 0.01 to 0.1 percent by weight of polymer is employed. Where more than one polymer is employed, the total concentration thereof should be within the range of from 0.01 to 0.1 percent by weight.

In the caustic solution, a concentration of caustic in the range of from 0.01 to 1.0 percent by weight is employed. Preferably, a concentration of about 0.1 percent by weight of caustic is employed in the caustic solution.

A single slug of the polymer solution followed by a single slug of the caustic solution are usually employed ahead of the water.

Water ahead of the polymer, however, is not detrimental. It may be of some benefit since the polymer solution will flow preferentially into the water-wet zones. A lesser volume of polymer solution, thus, is effective in reducing permeability in the zones offering least resistance to flow of the flooding water.

Furthermore, a dividing slug of water between the polymer solution and the caustic solution is sometimes beneficial. The dividing slug of water may be employed if desired. The water reduces the rate of desorption of the polymer. Consequently, the concentration of polymer in the flooding solutions does not build up so rapidly. Moreover, the injection pressure need not increase so much to maintain a satisfactory rate of injection.

On the other hand, however, multiple slugs of either solution may be employed. Multiple slugs of both solutions may be employed, alternating with each other and with the water. Or, the sequence of injecting the dividing slug of water after the polymer solution and before the caustic solution may be repeated more than once.

The method is beneficial as long as a slug of caustic follows a slug of polymer solution to effect desorption, dispersion, and redeposition of the polymer. Regardless of the number of slugs employed, the following guidelines are helpful in delineating the volumes of the solutions required.

The polymer solution is injected in a volume sufficient to divert the flooding water into uninvaded portions of the formations. Generally, a volume of at least 0.01 pore volume is required. Ordinarily, a volume no greater than 0.25 pore volume is required. A particularly preferred operational procedure is to inject the polymer solution until it is produced at the production means. Volumes greater than either of the latter two may be employed but, ordinarily, are unprofitable.

The caustic solution is injected in about the same volumes as the polymer solution. Generally, a volume of at least 0.01 pore volume is required. Ordinarily, no more than 0.25 pore volume is required. Similarly, as with the polymer solution, a particularly preferred operational procedure is to inject the caustic solution until it is produced at the production means. Also, similarly as with the polymer solution, volumes greater than either of the latter two may be employed but, ordinarily, are unprofitable.

On the other hand, the volume of the dividing slug of water, when employed between the slug of polymer solution and the slug of caustic solution, is about 0.1 the volume of polymer solution.

The beneficial effect of one embodiment of the invention in increasing the portion of the subterranean formation swept by the flooding water is illustrated in FIGURES 1 and 2. FIGURES 1 and 2 show diagrammatically a quadrant of a standard five-spot pattern. At one corner of the quadrant is injection means I. At the other corner is production means P.

Referring to FIGURE 1, as the polymer solution is injected into injection means I and into the subterranean formation, the initial frontal pattern will be cylindrical as illustrted by position 11 of the polymer solution. As the polymer solution is moved within the subterranean formation toward the production means P, the cylindrical frontal pattern is distorted through the influence of the pressure gradient which is strongest directly between the injection means and the production means. Such a typical, early, slightly distorted frontal pattern is illustrated by position 13. As flooding continues, the distortion becomes more severe, shown by position 15. The distorted frontal pattern is less unfavorable than if water without the polymer were used. Finally, the polymer solution is produced at the production means P as shown by position 17.

The portion of the subterranean formation which is swept at the time the polymer solution is produced at the production means varies in response to: (1) the stratification and permeability inhomogeneities in the formation, (2) the relative viscosities between the polymer solution and the in-situ oil, and (3) the relative permeabilities of the formation to the polymer solution and the oil. The portion may be as little as 25 percent of the total.

If water is injected immediately behind the polymer solution, it tends to flow through that portion of the subterranean formation which offers the least resistance to flow. Normally, this is the portion of the formation through which an aqueous solution has flowed. However, the polymer restricts permeability through this portion. The polymer and resultant restricted permeability around the injection well effect a decreased rate of injection at a given injection perssure. Also, the polymer forces the water injected therebehind to flow into previously uninvaded portions of the formation. Even when forced by the adsorbed polymer to flow into previously uninvaded portions of the formation, the water tends to establish the shortest route around the adsorbed polymer. Because of the restricted injection rate, only a little additional portion of the formation need be flushed with water to establish a preferential flow zone through and around the polymer for the restricted quantities of flooding water injected. Such additional portion is illustrated by contour 18 in FIGURE 1. Accordingly, it can be seen that the use of water alone following the polymer solution is relatively ineffective in flooding a greater portion of the subterranean formation.

Referring to FIGURE 2, the final position 18 of the conventional polymer flood is illustrated as a basis for comparison. When the caustic solution is injected behind the polymer solution, there is a desorption, dispersion, and redeposition mechanism brought into play as described hereinbefore. In the ultimate analysis, the polymer is redeposited over dotted portion 19 of the subterranean formation. The redeposition of the polymer in this dotted portion of the subterranean formation causes an adjustment of the flow contours. Moreover, the caustic solution desorbs the polymer from the rock pores around the injection well. This increases the permeability and hence the rate at which flooding water may be injected practicably. Large, additional portions of the formation are required to establish a preferential flow zone for the large quantities of flooding water injected. Consequently, a large portion of the formation, shown as portion 21, is swept by the flooding water. By employing the caustic solution behind the polymer solution, the amount of oil which is recovered from the subterranean formation may be increased as much as twofold.

Having thus described the invention, it will be understood that such description has been given by way of illustration and example and not by way of limitation, reference for the latter purpose being had to the appended claims.

What is claimed is:

1. A method of recovering oil from an oil-containing subterranean formation having an injection means comprising at least one injection well and a production means comprising at least one production well completed therein, which comprises the steps of:
    (a) injecting through said injection means into said formation a slug of a dilute aqueous polymer solution having a viscosity greater than water but flowable within said formation,
    (b) injecting a slug of a dilute aqueous caustic solution through said injection means into said formation,
    (c) injecting water through said injection means into said formation to drive said polymer and said caustic solutions and said oil within said subterranean formation toward said production means, and
    (d) producing oil to the surface through said production means.

2. The method of claim 1 wherein the polymer in said polymer solution is an amine adduct of copolymers of ethylenically unsaturated compounds and maleic anhydride, a partially hydrolyzed polyacrylamide, or a heteropolysaccharide produced by the bacterial genus Xanthomonas, and has a molecular weight within the range of from $10^6$ to $10^7$.

3. The method of claim 2 wherein said polymer is a heteropolysaccharide produced by *Xanthomonas campestris, Xanthomonas begonia, Xanthomonas phaseoli, Xanthomonas hederae, Xanthomonas incanae, Xanthomonas carotae,* or *Xanthomonas translucens.*

4. The method of claim 1 wherein said polymer is in a concentration of from 0.01 to 0.1 percent by weight of said polymer solution.

5. The method of claim 1 wherein said caustic is an alkali metal hydroxide or an alkali metal carbonate.

6. The method of claim 5 wherein said caustic is present in an amount of about 0.1 percent by weight of said caustic solution.

7. The method of claim 1 wherein said caustic is in a concentration of from 0.01 to 1.0 percent by weight of said caustic solution.

8. The method of claim 1 wherein a volume of 0.01 to 0.25 pore volume of said polymer solution is employed.

9. The method of claim 1 wherein said polymer solution is injected until it is produced at said production means.

10. The method of claim 1 wherein a volume of 0.01 to 0.25 pore volume of said caustic solution employed.

11. The method of claim 1 wherein said caustic solution is injected until it is produced at said production means.

12. The method of claim 1 wherein a dividing slug of water is injected through said injection means into said formation after said polymer solution and before said caustic solution.

13. The method of claim 12 wherein said dividing slug of water is about 0.1 the volume of said polymer solution.

14. The method of claim 1 wherein steps (a) and (b) are repeated.

15. The method of claim 14 wherein a dividing slug of water is injected through said injection means into said formation after step (a) and before step (b) more than once.

16. The method of claim 1 wherein steps (b) and (c) are repeated.

17. The method of claim 1 wherein steps (a), (b), and (c) are repeated.

References Cited

UNITED STATES PATENTS

| | | | |
|---|---|---|---|
| 2,827,964 | 3/1958 | Sandiford et al. | 166—9 |
| 3,039,529 | 6/1962 | McKennon | 166—9 |
| 3,070,158 | 12/1962 | Roper et al. | 166—9 |
| 3,079,336 | 2/1963 | Stright et al. | 166—9 X |
| 3,175,610 | 3/1965 | Osoba | 166—9 |
| 3,208,518 | 9/1965 | Patton | 166—9 |
| 3,289,759 | 12/1966 | Fisher | 166—9 |
| 3,305,016 | 2/1967 | Lindblom et al. | 166—9 |
| 3,308,885 | 3/1967 | Sandiford | 166—9 |

STEPHEN J. NOVOSAD, *Primary Examiner.*